(12) United States Patent
Liang et al.

(10) Patent No.: US 10,024,967 B2
(45) Date of Patent: Jul. 17, 2018

(54) DEVICE FOR ILLUMINATING A TARGET

(75) Inventors: Lim Yuan Liang, Singapore (SG); Phua Poh Boon, Singapore (SG)

(73) Assignee: DSO National Laboratories, Singapore (SG)

( * ) Notice: Subject to any disclaimer, the term of this patent is extended or adjusted under 35 U.S.C. 154(b) by 468 days.

(21) Appl. No.: 12/905,720

(22) Filed: Oct. 15, 2010

(65) Prior Publication Data

US 2011/0102598 A1    May 5, 2011

(30) Foreign Application Priority Data

Nov. 2, 2009  (SG) .................................. 2009/07278

(51) Int. Cl.
*H04N 5/33* (2006.01)
*G01D 5/30* (2006.01)
*G01S 17/89* (2006.01)

(52) U.S. Cl.
CPC .................................. *G01S 17/89* (2013.01)

(58) Field of Classification Search
CPC ....................................................... G01S 17/89
USPC .......................... 348/164; 359/152, 351, 353
See application file for complete search history.

(56) References Cited

U.S. PATENT DOCUMENTS

| | | |
|---|---|---|
| 4,015,906 A | 4/1977 | Sharon |
| 4,155,096 A | 5/1979 | Thomas et al. |
| 4,260,254 A | 4/1981 | Braun |
| 4,385,834 A | 5/1983 | Maxwell, Jr. |
| 4,386,848 A | 6/1983 | Clendenin et al. |
| 4,422,758 A | 12/1983 | Godfrey et al. |
| 4,569,591 A | 2/1986 | Ford et al. |
| 4,716,507 A | 12/1987 | Ames |
| 4,737,028 A | 4/1988 | Smith |
| 4,776,691 A | 10/1988 | Johnson et al. |
| 4,811,061 A | 3/1989 | Sud et al. |
| 4,917,490 A | 4/1990 | Schaffer, Jr. et al. |
| 5,029,023 A * | 7/1991 | Bearden et al. ................. 369/69 |
| 5,054,917 A | 10/1991 | Pepin et al. |
| 5,197,691 A | 3/1993 | Amon et al. |
| 5,249,501 A | 10/1993 | Waldman et al. |
| 5,334,828 A | 8/1994 | Shimoni et al. |
| 5,664,741 A | 9/1997 | Duke |
| 5,703,691 A * | 12/1997 | Klaras .................... G01N 21/39 356/236 |
| 5,946,132 A * | 8/1999 | Phillips ......................... 359/351 |

(Continued)

*Primary Examiner* — On S Mung
(74) *Attorney, Agent, or Firm* — Wells St. John P.S.

(57) ABSTRACT

A device for illuminating a target comprises a laser which produces a light beam, a viewing medium which receives electromagnetic radiation in an acceptance band, a beam-splitter which splits the light beam into a first beam and a second beam, and an imaging assembly. The imaging assembly comprises a light conversion medium and an element responsible for image creation comprising one of a light focusing medium and a light reflective medium. The first beam is directed along a travel path from the beam-splitter to the element and then to the light conversion medium, wherein the light conversion medium converts the first beam into electromagnetic radiation within the acceptance band. A spot object distance between the light conversion medium and the element is less than a target distance. The target distance is between the target and the beam-splitter less a distance between the beam-splitter and the element.

50 Claims, 3 Drawing Sheets

(56) References Cited

U.S. PATENT DOCUMENTS

| | | | |
|---|---|---|---|
| 6,069,656 A | 5/2000 | Silver | |
| 6,204,961 B1 | 3/2001 | Anderson et al. | |
| 6,211,951 B1 | 4/2001 | Guch, Jr. | |
| 6,476,979 B1* | 11/2002 | Schaack | 359/738 |
| 6,587,191 B2 | 7/2003 | Greenfield et al. | |
| 6,903,343 B2 | 6/2005 | Amon et al. | |
| 7,184,136 B2 | 2/2007 | McHugh | |
| 7,234,265 B1 | 6/2007 | Cheng et al. | |
| 8,107,056 B1* | 1/2012 | Riza | G01C 3/08 356/4.05 |
| 2007/0035824 A1* | 2/2007 | Scholz | 359/399 |
| 2008/0316498 A1* | 12/2008 | Drake et al. | 356/502 |
| 2011/0103410 A1* | 5/2011 | Hutchin | 372/9 |

* cited by examiner

DEVICE FOR ILLUMINATING A TARGET

FIELD OF THE INVENTION

The present invention relates to a device for illumination of a target, and more particularly, to a device for illuminating targets both close up and far away.

BACKGROUND OF THE INVENTION

A device for illuminating a target is a laser light source which is used to illuminate the target. Such devices may be mounted on aircraft, ground vehicles, or handheld. One problem with known devices is that viewing a laser spot depends strongly on the scattering efficiency of the target the laser impinges upon. For long distances and uncooperative targets, the laser spot may be too faint to show up. Further, optical components for known devices are relatively bulky and require precise alignment to avoid making the laser spot unviewable. Further, such known optical components are either useful for remote, long distance targets, or for close up targets, but not both. It would be desirable to provide a single device for illuminating targets both close up and far away, which is not dependent upon the scattering efficiency of the target, and which can be decoupled from optical components used for the target.

SUMMARY OF THE INVENTION

In accordance with an aspect of the present invention, there is provided a device for illuminating a target comprising a laser which produces a light beam, a viewing medium which receives electromagnetic radiation in an acceptance band, a beam-splitter which splits the laser produced outgoing light beam into a first beam and a second beam, and an imaging assembly. The imaging assembly comprises a light conversion medium and an element responsible for image creation comprising either a curved light focusing medium or a curved light reflective medium to focus the laser light beam. The first beam is directed along a path from the beam-splitter to the element and then to the light conversion medium, wherein the light conversion medium converts the first beam into electromagnetic radiation within the acceptance band. The second beam continues in the direction of the original outgoing light beam towards a target, when a target is present. A spot object distance between the light conversion medium and the element is less than a target distance when a target is present. The target distance is between the target and the beam-splitter less a distance between the beam-splitter and the element.

From the foregoing disclosure and the following more detailed description of various preferred embodiments it will be apparent to those skilled in the art that the present invention provides a significant advance in the technology of target illumination devices. Particularly significant in this regard is the potential the invention affords for providing a high quality device of compact structure and adaptable to a variety of target distances. Additional features and advantages of various preferred embodiments will be better understood in view of the detailed description provided below.

Figure 1:
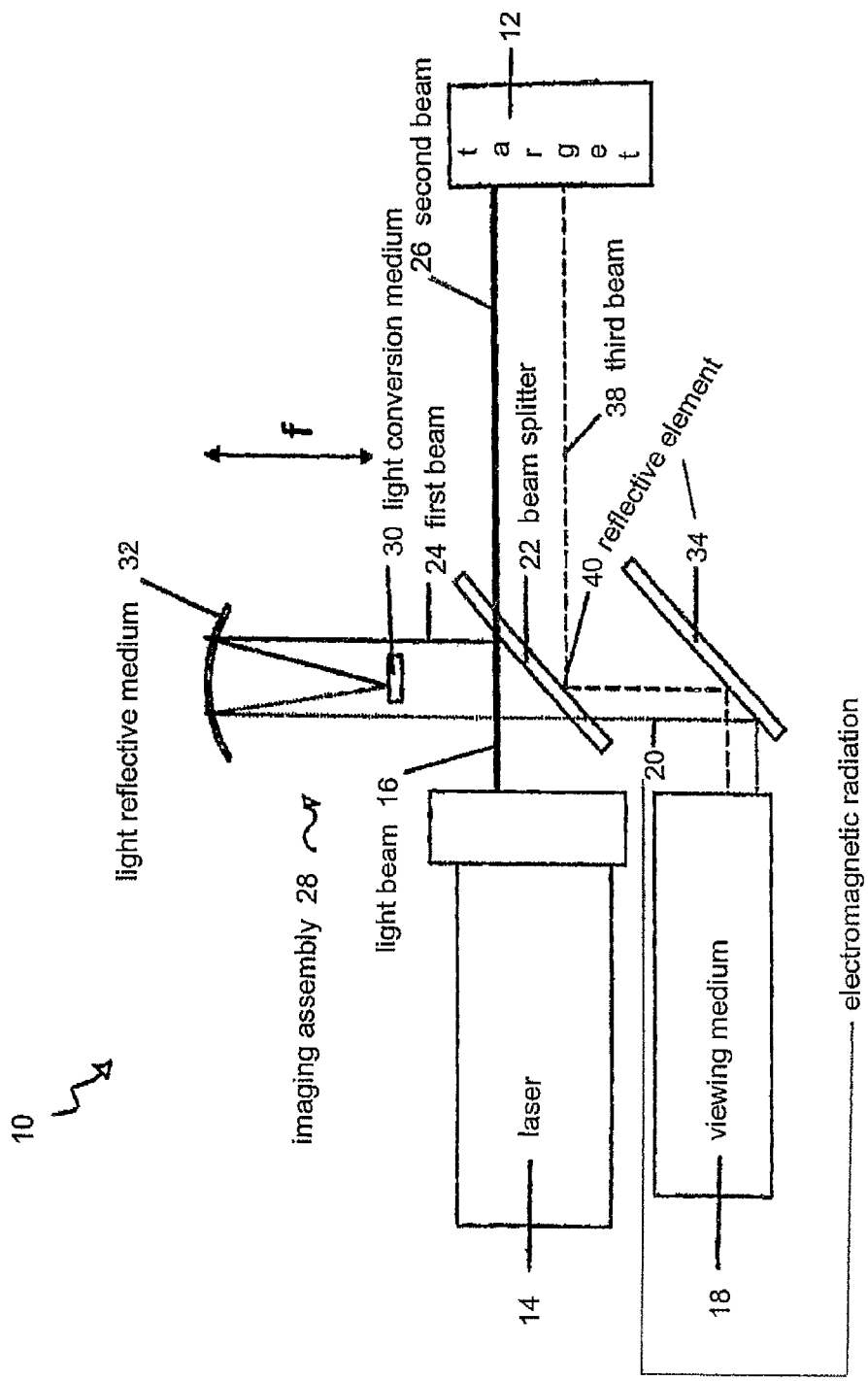
FIG. 1 is a device in accordance with a first embodiment suitable for illuminating targets at long distances.

It should be understood that the appended drawings are not necessarily to scale, presenting a somewhat simplified representation of various preferred features illustrative of the basic principles of the invention. The specific design features of the device as disclosed here, including, for example, the specific dimensions of the imaging assembly, will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the device for illuminating a target disclosed here. The following detailed discussion of various alternative and preferred features and embodiments will illustrate the general principles of the invention with reference to a device suitable for use with) targets at both long distances and short distances. Other embodiments suitable for other applications will be apparent to those skilled in the art given the benefit of this disclosure.

A first embodiment of the invention is illustrated in FIG. 1 which shows a device 10 for illuminating a target 12. The device 10 has a laser 14 which produces a light beam 16, a viewing medium 18 which receives electromagnetic radiation 20 in an acceptance band, a beam-splitter 22 which splits the light beam 16 into a first beam 24 and a second beam 26, and an imaging assembly 28. Light beam 16 is understood herein to not be restricted to merely visible light but may include for example, a laser beam of non-visible wavelengths.

The imaging assembly 28 comprises a light conversion medium 30 and a light reflective medium 32 having a focal length f. After the light beam 16 is split, the first beam 24 is directed along a travel path from the beam-splitter 22 to the curved light reflective medium 32 and then to the light conversion medium 30. The light conversion medium 30 then converts the first beam 24 into electromagnetic radiation 20 within the acceptance band. Electromagnetic radiation 20 may include visible wavelengths and/or rays that are non-visible, for example infrared radiation (IR). The acceptance band of such radiation can also be visible or non-visible, or a portion of both, or a portion of just visible or just non-visible wavelengths.

In FIG. 1, the first beam 24 travels along the travel path from the beam-splitter 22 to the light reflective medium 32 and then to the light conversion medium 30. A spot object distance r is the distance between the light reflective medium 32 and light conversion medium 30. The second beam 26 travels from the beam-splitter 22 to a spot on the target 12. Since a viewing medium acceptance bandwidth of a viewing medium 18 may not include wavelengths from the first beam 24, a third beam 38 may merely comprise reflected light from the target. The third beam 38 may be guided towards the viewing medium 18 by, for example, one or more reflective elements 40 and 34. Reflective element 40 can be part of beam-splitter 22 or the reflective element 40 may be separate from the beam-splitter 22. An example of reflective elements 40 and 34 is a mirror. A target distance v is the distance between the target 12 and beam-splitter 22 less the distance between beam-splitter 22 and the light reflective medium 32. Advantageously, the spot object distance r is less than the target distance v, somewhat reducing the sizes for the various optical components to function effectively.

An example of the light reflective medium 32 used in the embodiment of FIG. 1 is a mirror. Preferably, the mirror is concave in shape and more preferably, it is a protected silver concave mirror. Suitable mirrors may be purchased from CVI Melles Griot.

Figure 2:
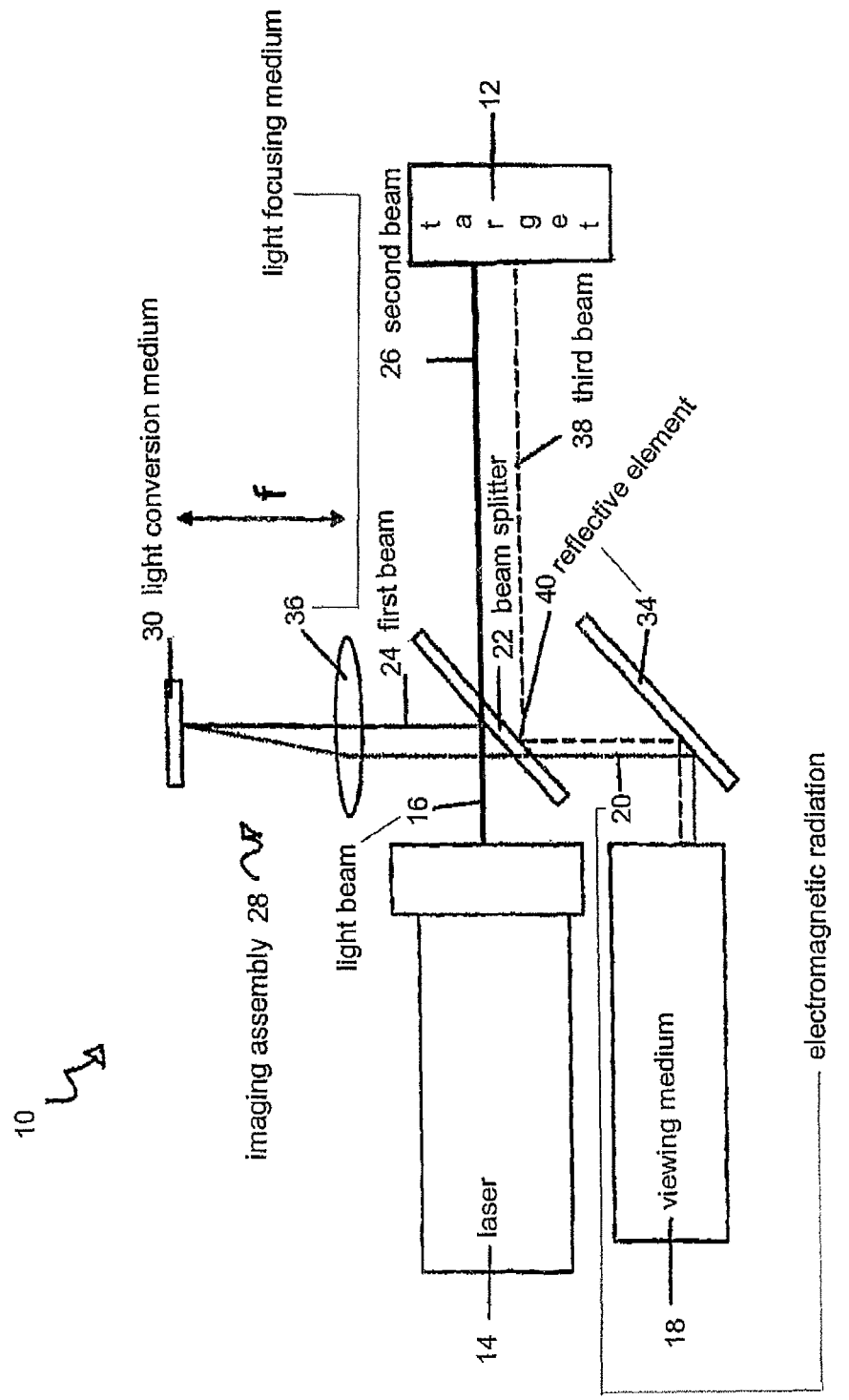
FIG. 2 is a device in accordance with a second embodiment suitable for illuminating targets at long distances.

In a second embodiment of the invention, FIG. 2 shows the device 10 where the light reflective medium 32 is replaced with a curved light focusing medium 36 having a focal length f, and can comprise a lens, most preferably, an achromatic lens. The spot object distance r is the distance between the light conversion medium 30 and the light focusing medium 36. This time the light focusing medium 36 is positioned between the beam-splitter 22 and the light conversion medium 30. The target distance v is the distance between the beam-splitter 22 and the target 12 less the distance between the beam-splitter 22 and the light focusing medium 36, Both the embodiments of FIGS. 1 and 2 are preferable for targets at long distances. Examples of such applications are laser designation and ranging applications.

The aforementioned embodiments may be used in both day and night applications. Individual elements may vary in day and night applications. For example, in day applications where visible light can be used, the viewing medium 18 may be a light focusing device such as a telescope operating in the visible wavelength, a human eye or a camera adapted to process visible light. The beam-splitter 22 may be a dichroic coating which preferentially reflects visible light over infra-red wavelengths. Suitable dichroic coatings may be obtained from Foctek Photonics, Inc. The light focusing medium 36 may be an achromatic lens which comprises a BK7 substrate, including those available from CVI Melles Griot. A light conversion medium 30 suitable for day applications may be a VSPOT-IR disc for infrared detection obtained from Kentek Corporation.

Turning to night applications, the viewing medium 18 may be any thermal imager or camera adapted to process infrared light operating in either mid-infrared wavelengths (3 to 5 microns) or far-infrared wavelengths (8 to 12 microns). An example of a suitable beam-splitter 22 is a dichroic coating which preferentially reflects the acceptance band of the thermal imager or the infrared camera over a laser wavelength. Suitable dichroic coatings can comprise ZnSe substrates which can be obtained from Foctek Photonics, Inc. Other suitable dichroic materials will be readily apparent to those skilled in the art given the benefit of this disclosure.

An example of a suitable light focusing medium 36 for night applications is an achromatic lens comprising a Zinc-Selenium (ZnSe) substrate. Mullite may be an example of the light conversion medium 30. Other suitable materials for use as a light conversion medium for night applications will be readily apparent to those skilled in the art given the benefit of this disclosure. Unless otherwise noted, other elements of this embodiment not specifically discussed here are similar to the embodiment shown in FIG. 1.

Figure 3:
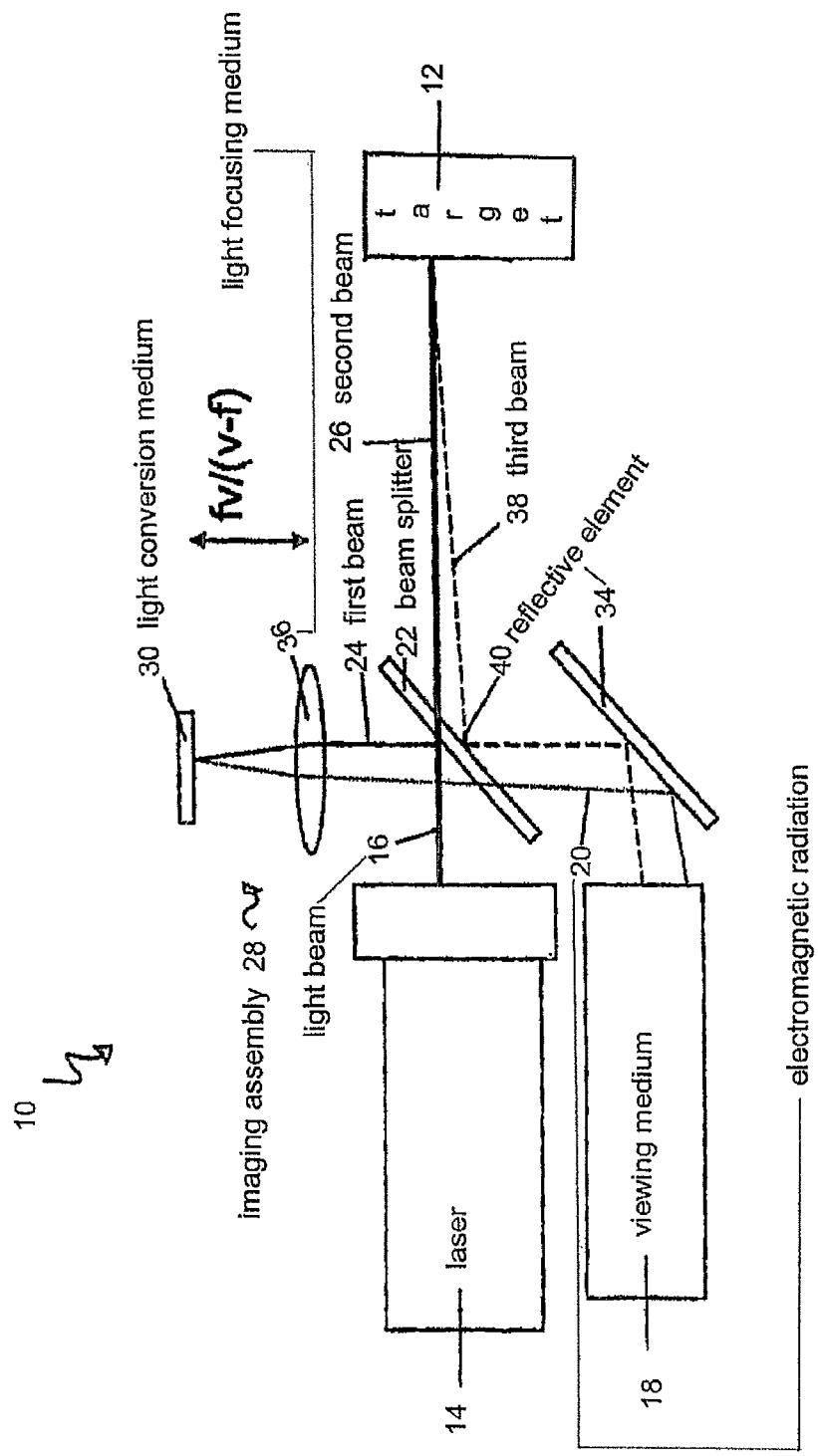
FIG. 3 is a device in accordance with a third embodiment suitable for illuminating targets at short distances.

In the embodiments of FIGS. 1-2, the target is at a relatively long distance from the beam splitter and laser beam. Thus, although beam 38 and 26 are shown separated at target 12 for convenience of illustration, over long distances, the relative locations of these items do converge at target 12. FIG. 3 illustrates a third embodiment of the invention suitable for use in short distance applications, for example, medical laser applications. For short distance applications, the spot object distance r will be less than for long range applications. Here, the spot object distance r is given as $fv/(v-f)$, wherein f is the focal length of the light focusing medium 36. The spot object distance is defined similarly as in FIG. 2, that is, the distance between the light conversion medium 30 and the light focusing medium 36. The target distance v is again the distance between the beam-splitter 22 and the target 12 less the distance between the beam-splitter 22 and light focusing medium 36. It should also be noted that the spot object distance given by $fv/(v-f)$ is generic to both short and long range distance applications. Of note, when the target distance v is very large, spot object distance r will be essentially equivalent to the focal length f of the light reflective medium 32 or light focusing medium 36. Unless otherwise noted, other elements of this embodiment not specifically discussed here are similar to the embodiment shown in FIG. 1.

In each embodiment, the spot object distance r and the target distance v are determined with reference to an element responsible for image creation (i.e., the light reflective medium 32 in FIG. 1 and the light focusing medium 36 in FIGS. 2 and 3). The element responsible for image creation inherently has a principal plane. It will be readily apparently to those skilled in the art, given the benefit of this disclosure, that the distances from the element are more precisely from the corresponding principal plane of that element. For many applications, the difference is not critical, such as where the lens is thin, for example.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A device for illuminating a target comprising, in combination:
   a laser which produces a laser produced outgoing light beam;
   a viewing medium which receives electromagnetic radiation in an acceptance band;
   a beam-splitter which splits the laser produced outgoing light beam into a first beam and a second beam; and
   an imaging assembly comprising a light conversion medium and an element responsible for image creation comprising either a curved light focusing medium or a curved light reflective medium to focus the laser light beam,
   wherein the first beam is directed along a path from the beam-splitter to the element and then to the light conversion medium, wherein the light conversion medium converts the first beam into electro-magnetic radiation within the acceptance band;
   wherein the second beam continues in the direction of the original outgoing light beam towards a target;

wherein a spot object distance between the light conversion medium and the element is less than a target distance when a target is present; and when a target is present, the target distance is between the target and the beam-splitter less a distance between the beam-splitter and the element.

2. The device of claim 1, wherein the light focusing medium is a lens.

3. The device of claim 1, wherein the light reflective medium is a mirror.

4. The device of any of claims 1 to 3, wherein the viewing medium is one of a human eye and a camera adapted to process visible light.

5. The device of any of claims 1 to 3, wherein the viewing medium is one of a thermal imager and a camera adapted to process infrared light.

6. The device of claim 1, wherein the electromagnetic radiation received in the acceptance band is one of infrared radiation, visible light, and both infrared radiation and visible light.

7. The device of claim 2, wherein the electromagnetic radiation received in the acceptance band is one of infrared radiation, visible light, and both infrared radiation and visible light.

8. The device of claim 3, wherein the electromagnetic radiation received in the acceptance band is one of infrared radiation, visible light, and both infrared radiation and visible light.

9. The device of claim 4, wherein the electromagnetic radiation received in the acceptance band is one of infrared radiation, visible light, and both infrared radiation and visible light.

10. The device of claim 5, wherein the electromagnetic radiation received in the acceptance band is one of infrared radiation, visible light, and both infrared radiation and visible light.

11. The device of claim 1, wherein the spot object distance between is $fv/(v-f)$ wherein, f is the focal length of the element; and v is the target distance.

12. The device of claim 2, wherein the spot object distance between is $fv/(v-f)$ wherein, f is the focal length of the element; and v is the target distance.

13. The device of claim 3, wherein the spot object distance between is $fv/(v-f)$ wherein, f is the focal length of the element; and v is the target distance.

14. The device of claim 4, wherein the spot object distance between is $fv/(v-f)$ wherein, f is the focal length of the element; and v is the target distance.

15. The device of claim 5, wherein the spot object distance between is $fv/(v-f)$ wherein, f is the focal length of the element; and v is the target distance.

16. The device of claim 6, wherein the spot object distance between is $fv/(v-f)$ wherein, f is the focal length of the element; and v is the target distance.

17. The device of claim 7, wherein the spot object distance between is $fv/(v-f)$ wherein, f is the focal length of the element; and v is the target distance.

18. The device of claim 8, wherein the element comprises the light focusing medium.

19. The device of claim 9, wherein the element comprises the light focusing medium.

20. The device of claim 10, wherein the element comprises the light focusing medium.

21. The device of claim 11, wherein the element comprises the light focusing medium.

22. The device of claim 12, wherein the element comprises the light focusing medium.

23. The device of claim 13, wherein the element comprises the light focusing medium.

24. The device of claim 14, wherein the element comprises the light focusing medium.

25. The device of claim 15, wherein the element comprises the light focusing medium.

26. The device of claim 16, wherein the element comprises the light focusing medium.

27. The device of claim 1, wherein the light conversion medium is Mullite.

28. The device of claim 2, wherein the light conversion medium is Mullite.

29. The device of claim 3, wherein the light conversion medium is Mullite.

30. The device of claim 4, wherein the light conversion medium is Mullite.

31. The device of claim 5, wherein the light conversion medium is Mullite.

32. The device of claim 6, wherein the light conversion medium is Mullite.

33. The device of claim 7, wherein the light conversion medium is Mullite.

34. The device of claim 8, wherein the light conversion medium is Mullite.

35. The device of claim 9, wherein the light conversion medium is Mullite.

36. The device of claim 10, wherein the light conversion medium is Mullite.

37. The device of claim 11, wherein the light conversion medium is Mullite.

38. The device of claim 12, wherein the light conversion medium is Mullite.

39. The device of claim 13, wherein the light conversion medium is Mullite.

40. The device of claim 14, wherein the light conversion medium is Mullite.

41. The device of claim 15, wherein the light conversion medium is Mullite.

42. The device of claim 16, wherein the light conversion medium is Mullite.

43. The device of claim 17, wherein the light conversion medium is Mullite.

44. The device of claim 18, wherein the light conversion medium is Mullite.

45. The device of claim 19, wherein the light conversion medium is Mullite.

46. The device of claim 20, wherein the light conversion medium is Mullite.

47. The device of claim 21, wherein the light conversion medium is Mullite.

48. The device of claim 22, wherein the light conversion medium is Mullite.

49. The device of claim 23, wherein the light conversion medium is Mullite.

50. The device of claim 24, wherein the light conversion medium is Mullite.

* * * * *